United States Patent
Ikeda et al.

(10) Patent No.: US 10,866,354 B2
(45) Date of Patent: Dec. 15, 2020

(54) DISPLAY DEVICE AND LIGHT GUIDING PANEL

(71) Applicant: Omron Corporation, Kyoto (JP)

(72) Inventors: Shogo Ikeda, Kyoto (JP); Yoshihiko Takagi, Kyoto (JP); Jun Kishimoto, Kyoto (JP); Junya Fujita, Kyoto (JP); Shohei Hisaki, Kyoto (JP); Masanori Mori, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/614,725

(22) PCT Filed: Apr. 6, 2018

(86) PCT No.: PCT/JP2018/014784
§ 371 (c)(1),
(2) Date: Nov. 18, 2019

(87) PCT Pub. No.: WO2019/030978
PCT Pub. Date: Feb. 14, 2019

(65) Prior Publication Data
US 2020/0183080 A1    Jun. 11, 2020

(30) Foreign Application Priority Data
Aug. 10, 2017    (JP) .................. 2017-155633

(51) Int. Cl.
*F21V 8/00* (2006.01)
*G02B 6/42* (2006.01)
(52) U.S. Cl.
CPC ......... *G02B 6/0055* (2013.01); *G02B 6/0053* (2013.01); *G02B 6/4259* (2013.01)
(58) Field of Classification Search
CPC ....... G02B 6/00; G02B 6/0053; G02B 6/0055
See application file for complete search history.

(56) References Cited

U.S. PATENT DOCUMENTS

2005/0239581 A1    10/2005    Naylor et al.
2012/0002442 A1    1/2012    Brandt et al.
(Continued)

FOREIGN PATENT DOCUMENTS

CN    102422189 A    4/2012
CN    104375236 A    2/2015
(Continued)

OTHER PUBLICATIONS

International Search Report issued in PCT/JP2018/014784 dated Jun. 19, 2018 (2 pages).
(Continued)

*Primary Examiner* — Joseph L Williams
*Assistant Examiner* — Jacob R Stern
(74) *Attorney, Agent, or Firm* — Osha Bergman Watanabe & Burton LLP

(57) ABSTRACT

A display device includes a light guiding panel 2 having an incoming surface 2a formed on one of side surfaces, a plurality of light sources (3-1 to 3-4) respectively corresponding to a plurality of patterns that can be displayed, and a controller 6 for controlling on and off of the plurality of light sources. The light guiding panel 2 has a first reflective surface (2d, 2e) formed on the other side surface of the light guiding panel 2, the first reflective surface reflecting light emitted from a first light source and entering the light guiding panel 2 through the incoming surface 2a, and changing the propagation direction of the light, and a plurality of prisms 11 which is formed on one surface 2b of the light guiding panel, is oriented toward light emitted from a light source corresponding to the pattern, entering the light guiding panel 2 through the incoming surface 2a, and directed to the pattern, and reflects the light so that the light is emitted through the other surface 2c of the light guiding panel.

20 Claims, 12 Drawing Sheets

(56) References Cited

U.S. PATENT DOCUMENTS

| | | | |
|---|---|---|---|
| 2016/0356944 A1 | | 12/2016 | Zhou |
| 2017/0285245 A1 | | 10/2017 | Fujita et al. |
| 2018/0156964 A1 | * | 6/2018 | Song .................... G02F 1/1368 |
| 2018/0182201 A1 | * | 6/2018 | Fujita ................ G07F 17/3211 |

FOREIGN PATENT DOCUMENTS

| | | | | | |
|---|---|---|---|---|---|
| CN | 205859852 U | | 1/2017 | | |
| JP | 2001-005416 A | | 1/2001 | | |
| JP | 2002-251910 A | | 9/2002 | | |
| JP | 2011-129251 A | | 6/2011 | | |
| JP | 2011129251 A | * | 6/2011 | ............ | H05B 45/00 |
| JP | 2015219313 A | | 12/2015 | | |
| JP | 2016122171 A | | 7/2016 | | |
| JP | 2016-154700 A | | 9/2016 | | |
| JP | 2017-107048 A | | 6/2017 | | |
| JP | 2017107048 A | * | 6/2017 | ............ | H05B 45/00 |

OTHER PUBLICATIONS

Written Opinion of the International Searching Authority issued in in PCT/JP2018/014784 dated Jun. 19, 2018 (12 pages).
International Preliminary Report on Patentability from PCT/JP2018/014784 completed on Mar. 6, 2019 (10 pages).
Office Action issued in Chinese Application No. 201880030635.2; dated Apr. 24, 2020 (14 pages).

* cited by examiner

DISPLAY DEVICE AND LIGHT GUIDING PANEL

TECHNICAL FIELD

The present invention relates to a display device capable of switching a displayed pattern, and a light guiding panel used in such a display device.

BACKGROUND ART

Conventionally, a display device has been proposed in which prisms are arrayed on one surface of a light guiding panel according to multiple patterns to be displayed, and a pattern to be displayed is dynamically switched by switching a light source to be turned on which is one of a plurality of light sources arranged to surround the light guiding panel. However, there may be a case in which light sources can be arranged only at a position along one side surface of the light guiding panel depending on a space in which the display device is disposed or the structure of a device in which the display device is incorporated. In view of this, a technique for dynamically switching a pattern to be displayed by switching a light source to be turned on in a plurality of light sources arranged along one side surface of a light guiding panel has been proposed (see, for example, Patent Document 1).

For example, the display device disclosed in Patent Document 1 includes a light guiding panel capable of displaying a plurality of patterns, a plurality of light sources arranged in line along one side of the sidewall of the light guiding panel, and a controller for controlling on and off of the plurality of light sources according to turn-on sequence information. The light guiding panel has a plurality of prisms that is arrayed on one surface of the light guiding panel for each pattern along the pattern, and reflects visible light which is emitted from a light source included in the plurality of light sources and corresponding to the pattern and which enters the light guiding panel through an incoming surface of the light guiding panel toward the other surface of the light guiding panel.

PRIOR ART DOCUMENTS

Patent Documents

Patent Document 1: Japanese Unexamined Patent Publication No. 2017-107048

SUMMARY OF THE INVENTION

Problems to be Solved by the Invention

In the display device disclosed in Patent Document 1, the prisms in each pattern are arrayed to face the incoming surface of the light guiding panel. Therefore, light emitted from the light source corresponding to the pattern to be displayed may also be reflected by the prisms arrayed in another pattern not corresponding to the light source, and directed toward a viewer, resulting in a case that a portion of another pattern not corresponding to the light source to be turned on may be visible to the viewer.

In view of this, an object of the present invention is to provide a display device capable of reducing the visibility of a pattern other than a pattern corresponding to a light source that emits light in a plurality of patterns, even when the light source can be arranged only along one side surface of the light guiding panel.

Means for Solving the Problem

As one aspect of the present invention, a display device is provided. The display device includes: a light guiding panel that is formed of a transparent member, is capable of displaying a plurality of patterns, and has an incoming surface formed on one of side surfaces; a plurality of light sources which is arranged to face the incoming surface and which corresponds to the plurality of patterns, respectively; and a controller configured to control on and off of the plurality of light sources. The light guiding panel has a first reflective surface formed on at least one of the other side surfaces of the light guiding panel, the first reflective surface reflecting light emitted from a first light source which is included in the plurality of light sources and entering the light guiding panel through the incoming surface, and changing a propagation direction of the light, and a plurality of prisms which is formed on one surface of the light guiding panel for each of the plurality of patterns, is arrayed along the pattern, is oriented toward light emitted from a light source which is included in the plurality of light sources and which corresponds to the pattern, entering the light guiding panel through the incoming surface, and directed to the pattern, and reflects the light so that the light is emitted through the other surface of the light guiding panel.

In this display device, it is preferable that the light guiding panel further has a second reflective surface formed on another side surface of the light guiding panel different from the first reflective surface, the second reflective surface further reflecting light emitted from the first light source and reflected by the first reflective surface, and directing the light toward a pattern included in the plurality of patterns and corresponding to the first light source.

Further, in this display device, it is preferable that the first reflective surface of the light guiding panel reflects light which is emitted from a second light source included in the plurality of light sources and enters the light guiding panel through the incoming surface, and directs the light toward a pattern included in the plurality of patterns and corresponding to the second light source.

Furthermore, in this display device, it is preferable that the first reflective surface of the light guiding panel is stepped along a direction parallel to the incoming surface or along a direction perpendicular to the incoming surface and the one surface on which the plurality of prisms is formed.

According to another aspect of the present invention, a light guiding panel formed of a transparent member and into a plate shape and capable of displaying a plurality of patterns is provided. The light guiding panel has: an incoming surface formed on one of side surfaces of the light guiding panel so as to face a plurality of light sources; a reflective surface formed on at least one of the other side surfaces of the light guiding panel, the reflective surface reflecting light emitted from any one of the plurality of light sources and entering the light guiding panel through the incoming surface, and changing a propagation direction of the light; and a plurality of prisms which is formed on one surface of the light guiding panel for each of the plurality of patterns, is arrayed along the pattern, is oriented toward light emitted from a light source which is included in the plurality of light sources and which corresponds to the pattern, entering the light guiding panel through the incoming surface, and directed to the pattern, and reflects the light so that the light is emitted through the other surface of the light guiding panel.

Effect of the Invention

The display device according to the present invention provides an effect of reducing the visibility of patterns other than the pattern corresponding to the light source that emits light, in the plurality of patterns, even when the light source can be arranged only along one side surface of the light guiding panel.

MODE FOR CARRYING OUT THE INVENTION

A display device according to an embodiment of the present invention will now be described with reference to the drawings. This display device has a light guiding panel obtained by forming a material transparent to light emitted from a plurality of light sources into a plate shape, and one of the surfaces of the light guiding panel is formed as an outgoing surface facing a viewer. Further, one of the side surfaces surrounding the outgoing surface of the light guiding panel is formed as an incoming surface facing the plurality of light sources. At least one of the side surfaces of the light guiding panel other than the incoming surface is formed as a reflective surface that reflects light emitted from the corresponding light source in the plurality of light sources and entering the light guiding panel, and changes a propagation direction of the light.

The light guiding panel is provided with: a plurality of patterns that corresponds one-to-one with the plurality of light sources; and a plurality of prisms that is provided along each of the plurality of patterns on the other surface of the light guiding panel on the side opposite to the outgoing surface, and that reflects light emitted from the corresponding light source and entering the light guiding panel toward the outgoing surface. Each of the prisms arrayed along a pattern which is included in the plurality of patterns and which corresponds to the light source emitting light which is to be reflected by the reflective surface is arrayed to be oriented toward the propagation direction of light reflected by the reflective surface. This enables the prisms arrayed for each pattern along the pattern to be oriented in greatly different directions, whereby the display device can reduce the visibility of patterns other than the pattern corresponding to the light source that emits light in the plurality of patterns.

In the following, for convenience of description, the side facing the viewer is defined as a front side and the opposite side is defined as a back side.

Figure 1:
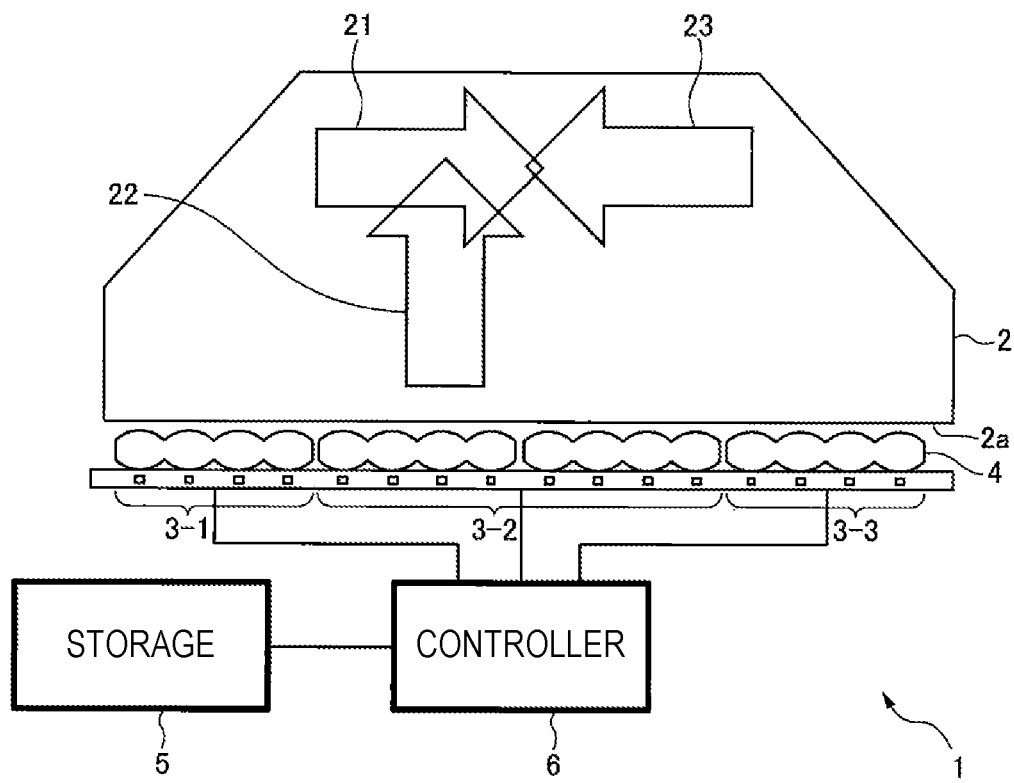
FIG. 1 is a diagram schematically showing a configuration of a display device according to one embodiment of the present invention.

FIG. 1 is a diagram schematically showing a configuration of a display device according to one embodiment of the present invention. The display device 1 includes a light guiding panel 2, three light sources 3-1 to 3-3, a collimating lens 4, a storage 5, and a controller 6.

The light guiding panel 2 is a plate-shaped member that is transparent to light emitted from the light sources 3-1 to 3-3. The light guiding panel 2 is formed by molding a resin that is transparent to visible light, such as polymethyl methacrylate (PMMA), polycarbonate, or cycloolefin polymer. The light guiding panel 2 is provided with three patterns 21 to 23 that can be displayed by turning on the light sources 3-1 to 3-3. That is, the light guiding panel 2 propagates light from the light source 3-1 while the light source 3-1 is turned on, and reflects the light from the light source 3-1 toward the viewer positioned within a prescribed range of angles with reference to the direction normal to the outgoing surface on the front side by a plurality of prisms (the detail of which will be described later) arrayed on the back side so as to correspond to the light source 3-1 and to form the pattern 21, thereby enabling the viewer to view the luminous pattern 21. Similarly, the light guiding panel 2 propagates light from the light source 3-2 while the light source 3-2 is turned on, and reflects the light from the light source 3-2 toward the viewer positioned within the prescribed range of angles with reference to the direction normal to the outgoing surface on the front side by a plurality of prisms arrayed on the back side so as to correspond to the light source 3-2 and to form the pattern 22, thereby enabling the viewer to view the luminous pattern 22. Further, the light guiding panel 2 propagates light from the light source 3-3 while the light source 3-3 is turned on, and reflects the light from the light source 3-3 toward the viewer positioned within the prescribed range of angles with reference to the direction normal to the outgoing surface on the front side by a plurality of prisms arrayed on the back side so as to correspond to the light source 3-3 and to form the pattern 23, thereby enabling the viewer to view the luminous pattern 23.

The detail of the light guiding panel 2 will be described later.

Each of the light sources 3-1 to 3-3 includes at least one light emitting element that emits visible light. In the present embodiment, the light sources 3-1 to 3-3 are arranged such that the light emitting surfaces of the light emitting elements face the incoming surface 2a that is one of the side walls of the light guiding panel 2. The light sources 3-1 to 3-3 are arranged in line along the incoming surface 2a at different positions. When each light source includes a plurality of light emitting elements, the light emitting elements may be arranged in line along the longitudinal direction of the incoming surface 2a.

The light sources 3-1 to 3-3 are turned on or off in response to a control signal from the controller 6. While the controller 6 turns on the light source 3-1, light emitted from the light source 3-1 is collimated by the collimating lens 4, and then enters the light guiding panel 2 through the incoming surface 2a,.The entered light propagates through the light guiding panel 2, is then reflected by a plurality of prisms that forms the pattern 21 and is provided on a diffusion surface on the back side of the light guiding panel 2, and is emitted from the outgoing surface on the front side. Similarly, while the controller 6 turns on the light source 3-2, light emitted from the light source 3-2 is collimated by the collimating lens 4, and then enters the light guiding panel 2 through the incoming surface 2a. The entered light propagates through the light guiding panel 2, is then reflected by a plurality of prisms that forms the pattern 22 and is provided on the diffusion surface on the back side of the light guiding panel 2, and is emitted from the outgoing surface on the front side. Further, while the controller 6 turns on the light source 3-3, light emitted from the light source 3-3 is collimated by the collimating lens 4, and then enters the light guiding panel 2 through the incoming surface 2a. The entered light propagates through the light guiding panel 2, is then reflected by a plurality of prisms that forms the pattern 23 and is provided on the diffusion surface on the back side of the light guiding panel 2, and is emitted from the outgoing surface on the front side.

The light emitting elements included in the light sources 3-1 to 3-3 are, for example, light emitting diodes, incandescent lamps, or fluorescent lamps. The emission colors of the light sources 3-1 to 3-3 may be the same or different from each other. Further, the emission luminance of the light sources 3-1 to 3-3 may be the same or different from each other.

The collimating lens 4 is disposed between the light sources 3-1 to 3-3 and the incoming surface 2a, and collimates light emitted from the light emitting elements included in the light sources 3-1 to 3-3. When each of the light sources has a plurality of light emitting elements arrayed in line along the longitudinal direction of the incoming surface 2a, the collimating lens 4 may also be formed as a lens array having a plurality of lenses arrayed in line along the longitudinal direction of the incoming surface 2a. The lenses are provided to correspond one-to-one with the light emitting elements, and each of the lenses collimates light emitted from the corresponding one of the light emitting elements so that the light perpendicularly enters the incoming surface 2a.

The collimating lens 4 may be configured as a refractive lens or may be configured as a diffractive lens such as a Fresnel zone plate. Further, the collimating lens 4 may be a cylindrical lens that collimates light from the corresponding light source only in the longitudinal direction of the incoming surface 2a.

The storage 5 includes, for example, a volatile or non-volatile memory circuit. The storage 5 stores turn-on control information indicating turn-on sequence or timings of turning on and off the light sources 3-1 to 3-3.

The controller 6 includes, for example, a processor and driving circuits for the light sources 3-1 to 3-3. The controller 6 controls on and off of the light sources 3-1 to 3-3 according to the turn-on control information.

For example, the controller 6 turns on the light source 3-1 and turns off the light sources 3-2 and 3-3 for making only the pattern 21 visible to the viewer positioned within a prescribed range of angles with reference to the direction normal to the outgoing surface of the light guiding panel 2 on the front side of the light guiding panel 2. To make only the pattern 22 visible to the viewer, the controller 6 turns off the light sources 3-1 and 3-3 and turns on the light source 3-2. To make only the pattern 23 visible to the viewer, the controller 6 turns off the light sources 3-1 and 3-2 and turns on the light source 3-3. To make two or more of the patterns 21 to 23 visible to the viewer at the same time, the controller 6 may simultaneously turn on the light sources corresponding to the patterns to be displayed. For example, to make both the pattern 21 and the pattern 22 visible to the viewer at the same time, the controller 6 may simultaneously turn on the light sources 3-1 and 3-2.

The timings at which the light sources 3-1 to 3-3 are turned on or off are designated by the turn-on control information. The turn-on control information can be, for example, data in which an identification number that identifies the light source to be turned on is simply represented according to the turn-on sequence of the light sources 3-1 to 3-3. For example, suppose that the identification number of the light source 3-1 is "1", the identification number of the light source 3-2 is "2", and the identification number of the light source 3-3 is "3". Each light source is turned on for each preset period in the sequence of light source 3-1→light source 3-2→light source 3-3, and each light source is turned on repeatedly at regular intervals. In this case, the turn-on control information may have the identification numbers in the sequence of "1", "2", and "3".

The detail of the light guiding panel 2 will be described below.

Figure 2:
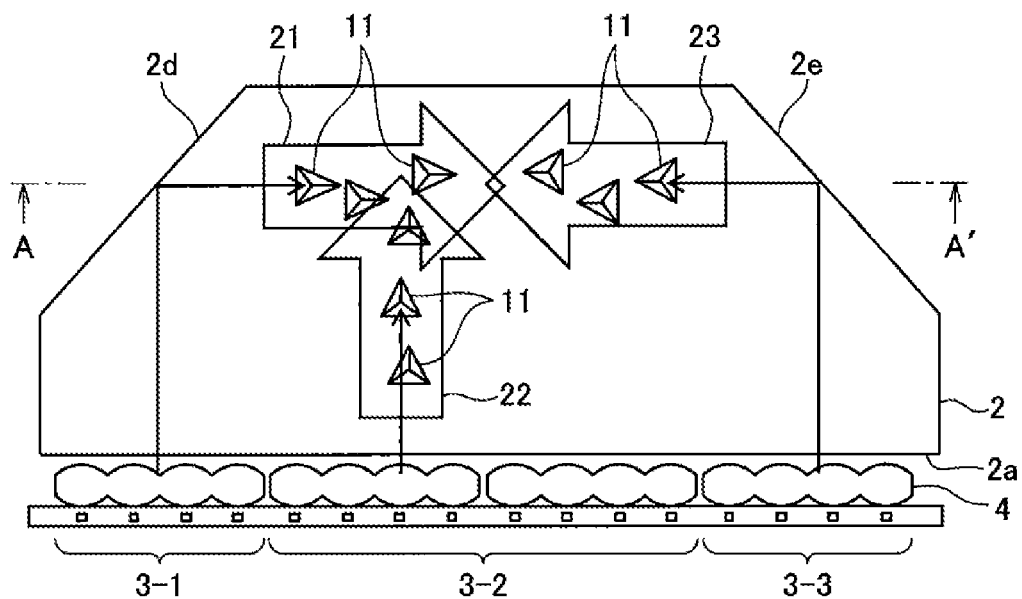
FIG. 2 is a schematic front view of a light guiding panel included in the display device.
Figure 3:
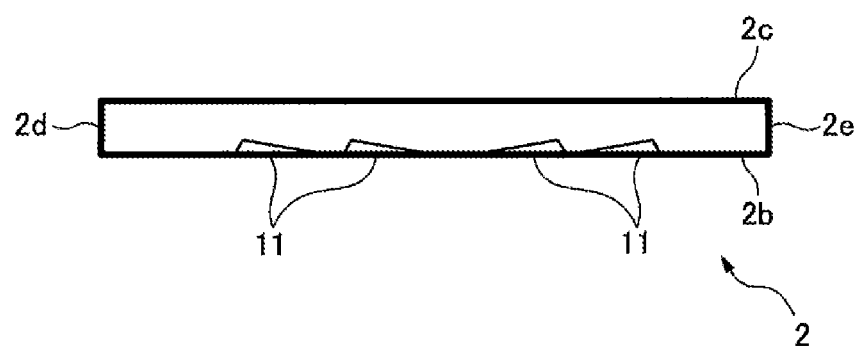
FIG. 3 is a schematic side sectional view of the light guiding panel taken along a line indicated by an arrow AA' in FIG. 2.

FIG. 2 is a schematic front view of the light guiding panel 2. FIG. 3 is a schematic side sectional view of the light guiding panel 2 taken along a line indicated by an arrow AA' in FIG. 2. As shown in FIGS. 2 and 3, one of the side surfaces of the light guiding panel 2 is formed as the incoming surface 2a facing the light sources 3-1 to 3-3. Light emitted from the light sources 3-1 to 3-3 is collimated by the collimating lens 4, and then enters the light guiding panel 2 through the incoming surface 2a.

A plurality of prisms 11 arrayed along each of the patterns 21 to 23 is formed on the diffusion surface 2b located on the back side of the light guiding panel 2. Each prism 11 reflects light which is emitted from the corresponding one of the light sources 3-1 to 3-3, enters the light guiding panel 2, and propagates through the light guiding panel 2, and causes the reflected light to be emitted through the outgoing surface 2c which is on the side opposite the diffusion surface 2b and which is located on the front side of the light guiding panel 2.

Further, the two side surfaces of the light guiding panel adjacent to the incoming surface 2a of the light guiding panel 2 are each formed such that a part closer to the side surface opposite the incoming surface 2a is tapered, and the tapered parts 2d and 2e are formed as reflective surfaces. The reflective surface 2d totally reflects light from the light source 3-1 propagating through the light guiding panel 2 and changes the propagation direction of the light. For example, if the angle between the incoming surface 2a and the reflective surface 2d is 45°, light from the light source 3-1 reflected by the reflective surface 2d propagates in a direction substantially parallel to the longitudinal direction of the incoming surface 2a. Similarly, the reflective surface 2e totally reflects light from the light source 3-3 propagating through the light guiding panel 2 and changes the propagation direction of the light. For example, if the angle between the incoming surface 2a and the reflective surface 2e is 45°, light from the light source 3-3 reflected by the reflective surface 2e propagates in a direction substantially parallel to the longitudinal direction of the incoming surface 2a and in a direction opposite to the propagation direction of light emitted from the light source 3-1 and reflected by the reflective surface 2d.

As described above, the prisms 11 are arrayed along the patterns 21 to 23, respectively. Each prism 11 arrayed in the pattern 21 reflects light which is emitted from the light source 3-1, enters the light guiding panel 2 through the incoming surface 2a, and then reflected by the reflective surface 2d toward the viewer, that is, toward the direction within the prescribed range of angles with reference to the direction normal to the outgoing surface 2c of the light guiding panel 2. For this purpose, each of the prisms 11 arrayed along the pattern 21 is formed so that the reflective surface thereof is oriented toward the propagation direction of light emitted from the light source 3-1 and reflected by the reflective surface 2d. For example, as described above, if the angle between the incoming surface 2a and the reflective surface 2d is 45°, each prism 11 arrayed along the pattern 21 may be formed such that the reflective surface thereof faces the reflective surface 2d and is perpendicular to the incoming surface 2a in a plane parallel to the diffusion surface 2b.

Further, each prism 11 arrayed in the pattern 22 reflects light which is emitted from the light source 3-2 and enters the light guiding panel 2 through the incoming surface 2a toward the direction within the prescribed range of angles with reference to the direction normal to the outgoing surface 2c of the light guiding panel 2. For this purpose, each of the prisms 11 arrayed along the pattern 22 is arrayed so that the reflective surface thereof is substantially parallel to the incoming surface 2a in the plane parallel to the diffusion surface 2b, that is, the reflective surface thereof faces any one of the light emitting elements of the light source 3-2.

Further, each prism 11 arrayed in the pattern 23 reflects light which is emitted from the light source 3-3, enters the light guiding panel 2 through the incoming surface 2a, and is then reflected by the reflective surface 2e toward the direction within the prescribed range of angles with reference to the direction normal to the outgoing surface 2c of the light guiding panel 2. For this purpose, each of the prisms 11 arrayed along the pattern 23 is formed so that the reflective surface thereof is oriented toward the propagation direction of light emitted from the light source 3-3 and reflected by the reflective surface 2e. For example, as described above, if the angle between the incoming surface 2a and the reflective surface 2e is 45°, each prism 11 arrayed along the pattern 23 may be formed such that the reflective surface thereof faces the reflective surface 2e and is perpendicular to the incoming surface 2a in a plane parallel to the diffusion surface 2b.

Due to the prisms 11 being formed as described above, the viewer can view the pattern 21 that appears to emit light on the surface of the light guiding panel 2 while the light source 3-1 is turned on. Similarly, the viewer can view the pattern 22 that appears to emit light on the surface of the light guiding panel 2 while the light source 3-2 is turned on. Further, the viewer can view the pattern 23 that appears to emit light on the surface of the light guiding panel 2 while the light source 3-3 is turned on. It should be noted that, in FIGS. 2 and 3, the size of each prism and the thickness of the light guiding panel 2 are exaggerated for clarity of drawings.

The prisms included in the plurality of prisms 11 and forming the pattern 21 are arrayed in a staggered or lattice pattern within the pattern 21, or randomly arrayed so that the array density of the prisms is constant within the pattern 21. Similarly, the prisms included in the plurality of prisms 11 and forming the pattern 22 are arrayed in a staggered or lattice pattern within the pattern 22, or randomly arrayed so that the array density of the prisms 11 is constant within the pattern 22. Further, the prisms included in the plurality of prisms 11 and forming the pattern 23 are arrayed in a staggered or lattice pattern within the pattern 23, or randomly arrayed so that the array density of the prisms 11 is constant within the pattern 23.

In a region where any two or more of the patterns 21 to 23 overlap, the prisms that respectively form the overlapping patterns may be arrayed.

Note that the prisms 11 forming the pattern 21, the prisms 11 forming the pattern 22, and the prisms 11 forming the pattern 23 can be formed to have the same configuration except for only the orientation and arrangement.

Figure 4A:
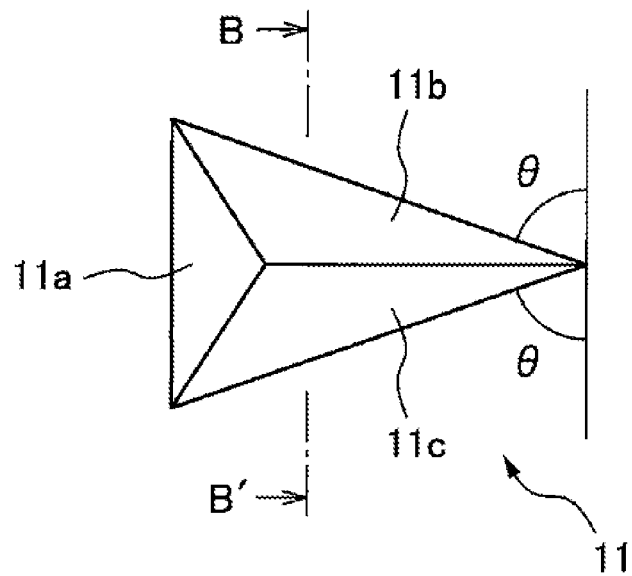
FIG. 4A is a schematic front view of a prism.
Figure 4B:
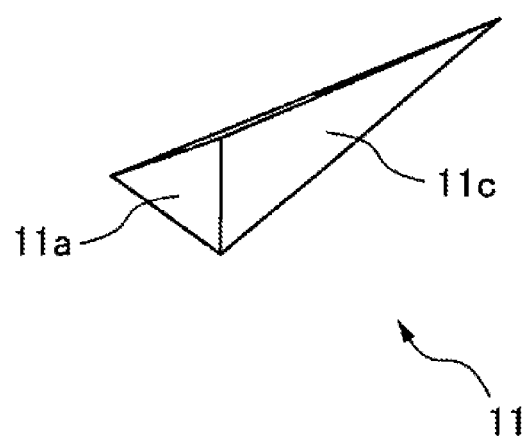
FIG. 4B is a schematic perspective view of the prism.
Figure 4C:
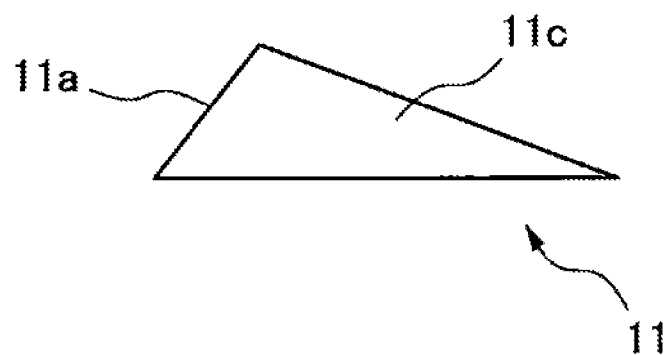
FIG. 4C is a schematic side view of the prism.
Figure 4D:
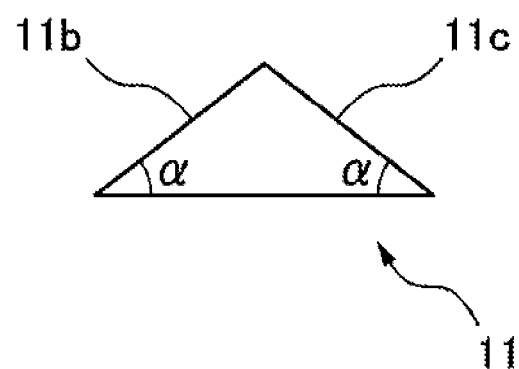
FIG. 4D is a schematic sectional view of the prism taken along a line BB' in FIG. 4A.

FIG. 4A is a schematic front view of the prism 11, and FIG. 4B is a schematic perspective view of the prism 11. FIG. 4C is a schematic side view of the prism 11. FIG. 4D is a schematic sectional view of the prism 11 along a line BB' in FIG. 4A. The prism 11 is formed, for example, as a triangular pyramid groove having the diffusion surface 2b as a bottom surface. One of the three inclined surfaces of the prism 11 is formed as a reflective surface 11a having a predetermined angle with respect to the diffusion surface 2b. The predetermined angle is set such that light from the corresponding light source (for example, the light source 3-1 in the case of prisms forming the pattern 21) entering the light guiding panel 2 is totally reflected and directed in the direction within the prescribed range of angles with reference to the direction normal to the outgoing surface 2c. The other two of the three inclined surfaces of the prism 11 are formed as diffusion surfaces 11b and 11c that reflect light not from the corresponding light source (for example, light from the light source 3-2 or 3-3 in the case of prisms forming the pattern 21) toward a direction outside the prescribed range of angles with reference to the direction normal to the outgoing surface 2c so that the viewer cannot view the light.

Referring back to FIG. 2, the prisms included in the plurality of prisms 11 and forming the pattern 21 are arrayed such that, for example, the reflective surfaces 11a are substantially perpendicular to the incoming surface 2a in the plane parallel to the diffusion surface 2b in order that the reflective surfaces 11a are oriented toward the propagation direction of light emitted from the light source 3-1 and reflected by the reflective surface 2d. Similarly, the prisms included in the plurality of prisms 11 and forming the pattern 22 are arrayed such that the reflective surfaces 11a face any of the light emitting elements of the light source 3-2, that is, the reflective surfaces 11a and the incoming surface 2a are substantially parallel to each other in the plane parallel to the diffusion surface 2b. Further, the prisms included in the plurality of prisms 11 and forming the pattern 23 are arrayed such that the reflective surfaces 11a are substantially perpendicular to the incoming surface 2a in the plane parallel to the diffusion surface 2b in order that the reflective surfaces are oriented toward the propagation direction of light emitted from the light source 3-3 and reflected by the reflective surface 2e.

As a result, light emitted from the light source 3-1, entering the light guiding panel 2, and directed to any one of the prisms forming the pattern 21 is reflected by the reflective surface 11*a* of the prism and emitted through the outgoing surface 2*c* of the light guiding panel 2 toward the viewer positioned on the front side of the light guiding panel 2. On the other hand, light emitted from the light source 3-2 or 3-3, entering the light guiding panel 2, and directed to any one of the prisms forming the pattern 21 is reflected by the diffusion surface 11*b* or 11*c* of the prism toward a direction outside the prescribed range of angles with reference to the direction normal to the outgoing surface 2*c* of the light guiding panel 2 so as not to be visible to the viewer.

Here, the direction in which the light emitted from the light source 3-2 or 3-3 and entering the light guiding panel 2 is reflected by the diffusion surface 11*b* or 11*c* of the prism forming the pattern 21 is determined by a combination of an angle (hereinafter referred to as a rotation angle for convenience) $\theta$ between the direction perpendicular to the propagation direction of light emitted from the light source 3-1 and reflected by the reflective surface 2*d*, that is, the direction perpendicular to the incoming surface 2*a*, and the diffusion surface 11*b* or 11*c* of the prism, and an angle (hereinafter referred to as an inclination angle for convenience) $\alpha$ between the diffusion surface 2*b* of the light guiding panel 2 and the diffusion surface 11*b* or 11*c* of the prism. Further, the angle of the reflected light with respect to the direction normal to the outgoing surface 2*c* when the reflected light is emitted from the light guiding panel 2 is affected by the refractive index of the material of the light guiding panel 2. Similarly, the direction in which light emitted from the light source 3-3 and entering the light guiding panel 2 is reflected by the diffusion surface 11*b* or 11*c* of the prism is also determined by the combination of the rotation angle $\theta$ and the inclination angle $\alpha$. Further, the angle of the reflected light with respect to the direction normal to the outgoing surface 2*c* when the reflected light is emitted from the light guiding panel 2 is affected by the refractive index of the material of the light guiding panel 2.

For example, suppose that the direction in which the viewer is positioned, that is, the prescribed range of angles with reference to the direction normal to the outgoing surface 2*c* of the light guiding panel 2, is within 30° from the direction normal to the outgoing surface 2*c* of the light guiding panel 2. In this case, when the light guiding panel 2 is formed of polycarbonate (having a refractive index of 1.59) or PMMA (having a refractive index of 1.49), each prism 11 is preferably formed such that the rotation angle $\theta$ is within the range of 25° to 65° and the inclination angle $\alpha$ is within the range of 25° to 55° in order to cause light emitted from a light source other than the corresponding light source and reflected by the prism 11 to be directed in a direction outside the prescribed range of angles to prevent the light from being directed to the viewer.

Further, suppose that the prescribed range of angles with reference to the direction normal to the outgoing surface 2*c* of the light guiding panel 2 is within 45° from the direction normal to the outgoing surface 2*c* of the light guiding panel 2. In this case, when the light guiding panel 2 is formed of polycarbonate or PMMA, each prism 11 is preferably formed such that the rotation angle $\theta$ is within the range of 35° to 55° and the inclination angle $\alpha$ is within the range of 25° to 55° in order to cause light emitted from a light source other than the corresponding light source and reflected by the prism 11 to be directed in a direction outside the prescribed range of angles.

Furthermore, suppose that the prescribed range of angles with reference to the direction normal to the outgoing surface 2*c* of the light guiding panel 2 is within 60° from the direction normal to the outgoing surface 2*c* of the light guiding panel 2. In this case, when the light guiding panel 2 is formed of polycarbonate or PMMA, each prism 11 is preferably formed such that the rotation angle $\theta$ is within the range of 40° to 50° and the inclination angle $\alpha$ is within the range of 25° to 55° in order to cause light emitted from a light source other than the corresponding light source and reflected by the prism 11 to be directed in a direction outside the prescribed range of angles.

The rotation angle and inclination angle of the diffusion surfaces of the prisms 11 in the patterns 22 and 23 may be set similarly.

As described above, in the display device, at least one of the side surfaces of the light guiding panel other than the incoming surface is formed as a reflective surface that totally reflects light emitted from the corresponding light source in the plurality of light sources and entering the light guiding panel, and changes a propagation direction of the light. Each of the prisms arrayed along a pattern which is included in the plurality of patterns formed on the light guiding panel and which corresponds to the light source emitting light which is to be reflected by the reflective surface of the light guiding panel is arrayed to be oriented toward the propagation direction of light reflected by the reflective surface. Thus, the prisms arrayed for each of the patterns along the pattern are oriented in different directions, whereby the display device can reduce the visibility of patterns other than the pattern corresponding to the light source that emits light in the plurality of patterns. In particular, this display device can reduce the visibility of patterns other than the pattern to be displayed even if a plurality of patterns is closely arranged or arranged so as to overlap each other.

According to a modification, the reflective surface of the light guiding panel 2 may be stepped.

Figure 5A:
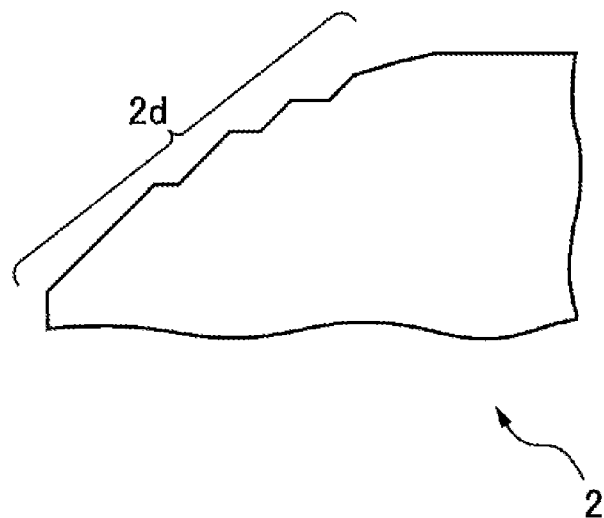
FIG. 5A is a partially enlarged view of a light guiding panel according to a modification.
Figure 5B:
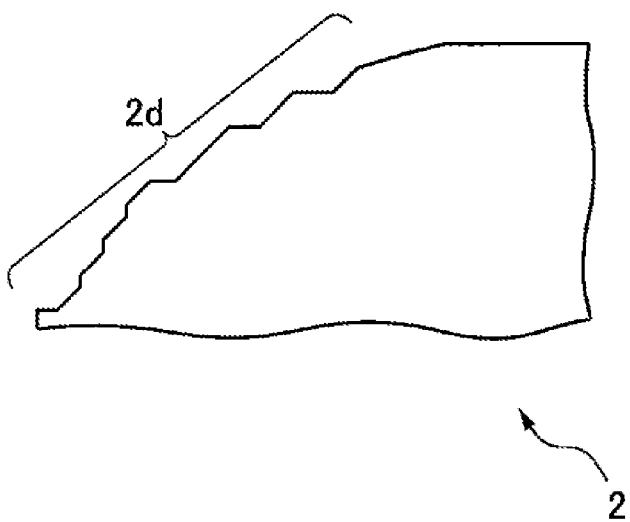
FIG. 5B is a partially enlarged view of a light guiding panel according to a modification.

FIGS. 5A and 5B are partially enlarged views of a light guiding panel 2 according to the modification. In the example shown in FIG. 5A, a reflective surface 2*d* of the light guiding panel 2 is stepped along a direction parallel to an incoming surface 2*a*. Therefore, as compared with the example shown in FIG. 2, the reflective surface 2*d* comes closer to a reflective surface 2*e* with nearness to the side surface on the side opposite the incoming surface 2*a*, whereby the light guiding panel 2 can be downsized.

In the example shown in FIG. 5B, a part of a reflective surface 2*d* closer to an incoming surface 2*a* is stepped along the direction perpendicular to the incoming surface 2*a* and perpendicular to a diffusion surface 2*b*. Thus, the width of light emitted from the light source 3-1 and reflected by the reflective surface 2*d* in the direction perpendicular to the incoming surface 2*a* can be increased. Accordingly, the length of the light guiding panel 2 along the longitudinal direction of the incoming surface 2*a* can be shortened, compared to the case where such a step is not provided under the condition that the width of such light is the same.

According to another modification, a light guiding panel may be formed such that light emitted from any one of the light sources is reflected by two or more reflective surfaces formed on the light guiding panel, and then directed toward a viewer by a prism that forms a pattern.

Figure 6:
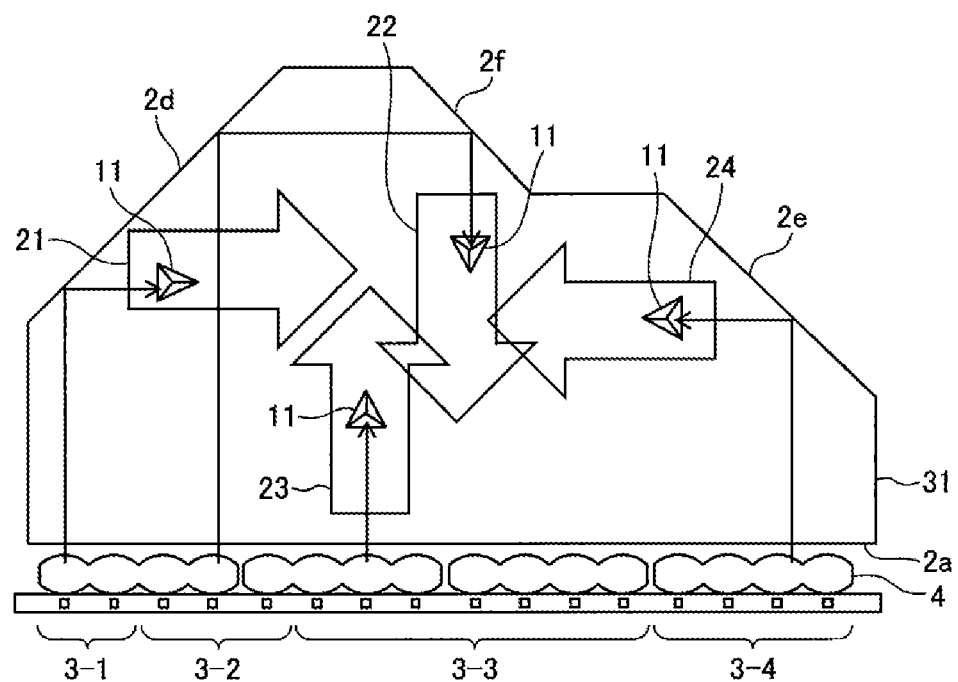
FIG. 6 is a view schematically showing the configuration of a light guiding panel according to another modification.

FIG. 6 is a view schematically showing the configuration of a light guiding panel according to this modification. According to this modification, one of the side surfaces of a light guiding panel 31 is formed as an incoming surface 2*a*, and three reflective surfaces 2*d* to 2*f* are formed on the other side surfaces of the light guiding panel 31. Further, the light guiding panel 31 is provided with four patterns 21 to 24. As in the above embodiment, a plurality of prisms 11 that causes light propagating through the light guiding panel 31 to be emitted toward the viewer through an outgoing surface 2c is arrayed along each of the patterns. Further, four light sources 3-1 to 3-4 are arranged in line along the longitudinal direction of the incoming surface 2a. The light sources 3-1 to 3-4 correspond one-to-one with the patterns 21 to 24, and are used to display the corresponding patterns. A collimating lens 4 is disposed between the light sources 3-1 to 3-4 and the incoming surface 2a. Accordingly, light emitted from the light sources 3-1 to 3-4 is collimated by the collimating lens 4, and the collimated light enters the light guiding panel 31 through the incoming surface 2a.

Similar to the above embodiment, the reflective surface 2d totally reflects light emitted from the light source 3-1 and entering the light guiding panel 31 through the incoming surface 2a, and directs the light toward the prisms 11 forming the pattern 21. Similarly, the reflective surface 2e totally reflects light emitted from the light source 3-4 and entering the light guiding panel 31 through the incoming surface 2a, and directs the light toward the prisms 11 forming the pattern 24, as in the abovementioned embodiment. Light emitted from the light source 3-3 and entering the light guiding panel 31 through the incoming surface 2a is reflected toward the viewer by each prism 11 forming the pattern 23.

Further, in this modification, the reflective surface 2f is formed on the side surface on the side opposite the incoming surface 2a so as to face the reflective surface 2d. Therefore, light emitted from the light source 3-2 and entering the light guiding panel 31 through the incoming surface 2a is reflected by the reflective surface 2d and then reflected again by the reflective surface 2f toward a region where the pattern 22 is formed. For example, if the angle between the reflective surface 2d and the incoming surface 2a is 45° and the angle between the reflective surface 2d and the reflective surface 2f is 90°, light emitted from the light source 3-2 and reflected again by the reflective surface 2f is directed to the incoming surface 2a along the direction normal to the incoming surface 2a. Then, the light reflected again by the reflective surface 2f is reflected toward the viewer by each prism 11 forming the pattern 22.

In this example, the reflective surface 2d is formed so as to reflect both light from the light source 3-1 and light from the light source 3-2. That is, one reflective surface 2d changes the propagation direction of light beams from the two light sources, and thus, the structure of the light guiding panel 31 is simplified while light beams from the respective light sources can be propagated in different directions.

As described above, according to this modification, the display device enables, for each of the four patterns, light from the light source that illuminates the corresponding pattern to propagate in different directions. Therefore, this display device can reduce the visibility of patterns other than the pattern corresponding to the light source that emits light in the four patterns. In particular, the display device can also direct light emitted from any of the light sources and entering the light guiding panel toward the incoming surface by reflecting the light on the two reflective surfaces. Therefore, this display device more reliably prevents the pattern corresponding to the light source from being visible by light emitted from another light source by setting the orientation of each prism forming the pattern to be reverse to the incoming surface.

Figure 7:
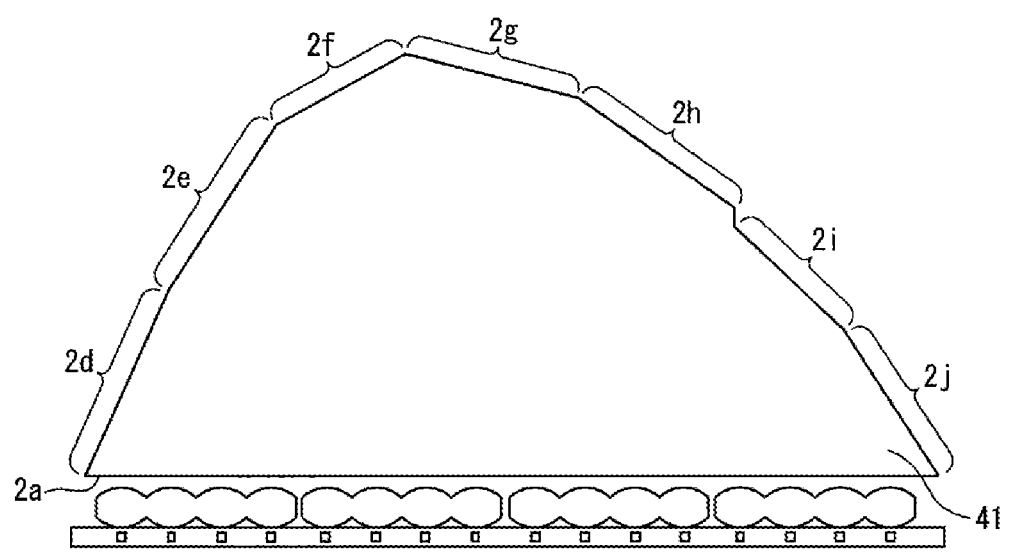
FIG. 7 is a view schematically showing the configuration of a light guiding panel according to still another modification.

FIG. 7 is a view schematically showing the configuration of a light guiding panel according to still another modification. In a light guiding panel 41 according to this modification, seven reflective surfaces 2d to 2j are formed on the side surfaces other than an incoming surface 2a. The reflective surfaces 2d to 2j are oriented in different directions. Therefore, the light guiding panel 41 can direct light beams emitted from a plurality of light sources and entering through the incoming surface 2a in different directions by the respective reflective surfaces. Thus, even if more patterns than in the above embodiment and modifications are provided, the light guiding panel 41 can reduce the visibility of patterns other than the pattern corresponding to the light source that emits light due to the configuration in which the light sources and the patterns are formed to correspond one-to-one with the reflective surfaces.

The reflective surface may not totally reflect light entering the reflective surface, depending on the direction of the light. Therefore, a reflective film formed of a metal thin film or a multilayer film may be provided on the reflective surface of the light guiding panel in which an angle of incidence of light from the corresponding light source is smaller than the critical angle of total reflection.

According to still another modification, instead of two prisms respectively corresponding to light beams entering from two directions through two incoming surfaces orthogonal to each other, a prism may be used in which inclined surfaces oriented toward the two directions are formed as reflective surfaces. Similarly, instead of three or four prisms respectively corresponding to light beams from three or four directions, a prism may be used which is formed into a square pyramid shape and which has reflective surfaces formed on the respective inclined surfaces.

Figure 8A:
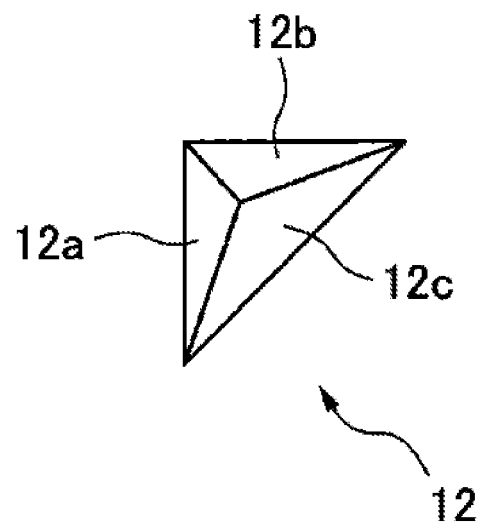
FIG. 8A is a view showing an example of the shape of a prism according to a modification.
Figure 8B:
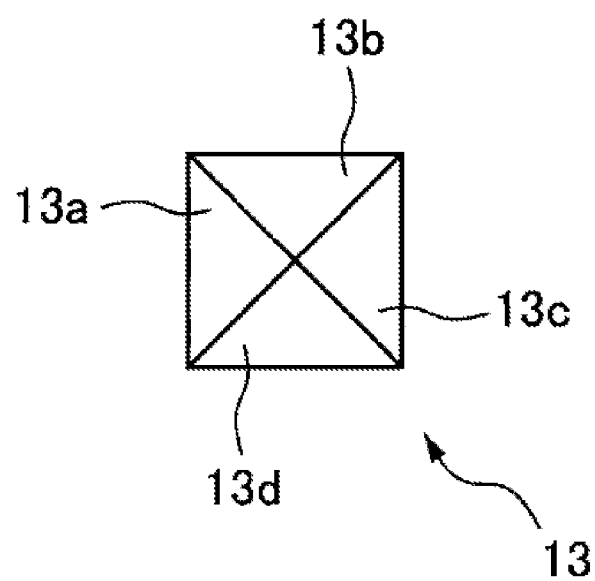
FIG. 8B is a view showing an example of the shape of a prism according to a modification.

FIGS. 8A and 8B are views showing an example of the shape of a prism according to this modification. A prism 12 shown in FIG. 8A is formed into a triangular pyramid shape, and two of the three inclined surfaces are formed as reflective surfaces 12a and 12b. The prism 12 is used instead of the prism formed in such a way that the reflective surface is oriented toward light emitted from the light source 3-1, reflected by the reflective surface 2d, and directed toward the pattern 21, and the prism formed in such a way that the reflective surface is oriented toward light emitted from the light source 3-2, entering the light guiding panel 2 through the incoming surface 2a, and propagating through the light guiding panel 2 along the direction normal to the incoming surface 2a in FIG. 2. In this case, the reflective surface 12a of the prism 12 is formed so as to be oriented toward light which is directed to the pattern 21 from the reflective surface 2d, and the reflective surface 12b is formed to face the incoming surface 2a. Therefore, on the diffusion surface 26b of the light guiding panel 2, the reflective surface 12a and the reflective surface 12b are orthogonal to each other. The remaining one of the three inclined surfaces of the prism 12 is formed as a diffusion surface 12c which is inclined with respect to the propagation direction of light which is emitted from the light source 3-3 and reflected by the reflective surface 2e. Thus, the prism 12 reflects light emitted from the light source 3-1 and entering the light guiding panel 2 toward the viewer positioned on the front side of the light guiding panel 2 by the reflective surface 12a, and light emitted from the light source 3-2 and entering the light guiding panel 2 toward the viewer positioned on the front side of the light guiding panel 2 by the reflective surface 12b. On the other hand, light emitted from the light source 3-3, entering the light guiding panel 2, and reflected by the reflective surface 2e is reflected by the diffusion surface 12c toward a direction outside the prescribed range of angles with reference to the direction normal to the outgoing surface 2c.

The prism 12 may be arrayed so that the two reflective surfaces 12a and 12b are respectively oriented toward the incoming surface 2a and toward the propagation direction of light emitted from the light source 3-3 and reflected by the reflective surface 2e. In this case, the prism 12 reflects light emitted from the light source 3-2 and entering the light guiding panel 2 toward the viewer positioned on the front side of the light guiding panel 2 by the reflective surface 12a, and light emitted from the light source 3-3 and entering the light guiding panel 2 toward the viewer positioned on the front side of the light guiding panel 2 by the reflective surface 12b. On the other hand, light emitted from the light source 3-1, entering the light guiding panel 2, and reflected by the reflective surface 2d is reflected by the diffusion surface 12c toward a direction outside the prescribed range of angles with reference to the direction normal to the outgoing surface 2c.

A prism 13 shown in FIG. 8B is formed into a square pyramid shape, and the four inclined surfaces are formed as reflective surfaces 13a to 13d, respectively. The prism 13 is used instead of, for example, the prism formed in such a way that the reflective surface is oriented toward the propagation direction of light emitted from the light source 3-1, entering the light guiding panel 2, and reflected by the reflective surface 2d, the prism formed in such a way that the reflective surface faces any one of the light emitting elements of the light source 3-2, and the prism formed in such a way that the reflective surface is oriented toward the propagation direction of light emitted from the light source 3-3, entering the light guiding panel 2, and reflected by the reflective surface 2e. In this case, the prism 13 may be arrayed such that, for example, three of the reflective surfaces are oriented toward: the propagation direction of light emitted from the light source 3-1, entering the light guiding panel 2, and reflected by the reflective surface 2d; the incoming surface 2a; and the propagation direction of light emitted from the light source 3-3, entering the light guiding panel 2, and reflected by the reflective surface 2e, respectively.

According to this modification, the display device can reduce the number of prisms arrayed in each pattern. Therefore, the processing of the light guiding panel is facilitated. Moreover, due to the decrease in number of the prisms, a decrease in the density of the reflective surface of the prism per light source can be suppressed, whereby a decrease in brightness of the region where the multiple patterns overlap can be suppressed.

Figure 9:
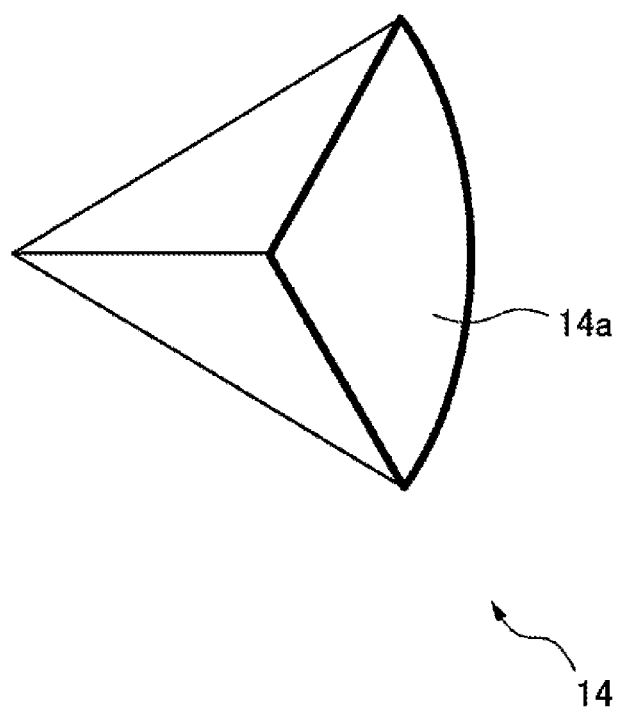
FIG. 9 is a schematic front view of a prism according to still another modification.

FIG. 9 is a schematic front view of a prism formed on a light guiding panel according to still another modification. A prism 14 according to this modification is different from the prism 11 according to the above-described embodiment in that a reflective surface 14a of the prism 14 is formed in a curved surface having a convex surface. Thus, the direction of reflection changes depending on the position where light emitted from the light source and propagating through the light guiding panel enters the reflective surface 14a, so that the range in which the viewer can view light emitted from the light guiding panel 2 is widened. Therefore, the viewing angle at which the pattern corresponding to the light source that is turned on can be viewed is widened.

Figure 10A:
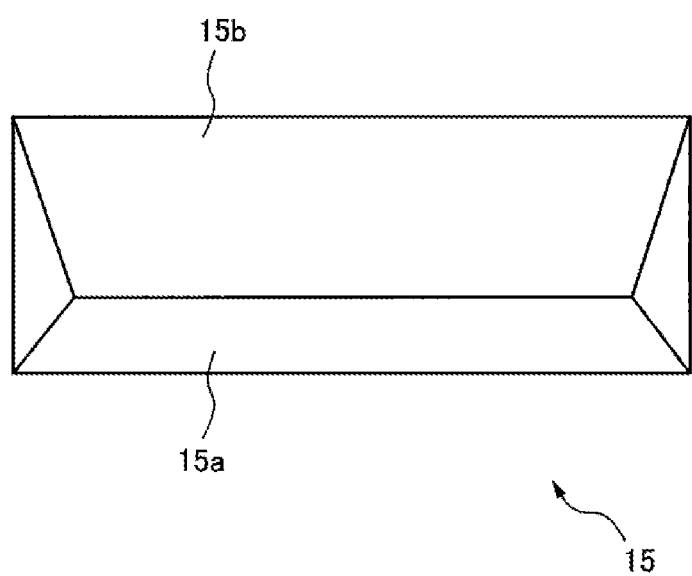
FIG. 10A is a schematic front view of a prism according to still another modification.
Figure 10B:
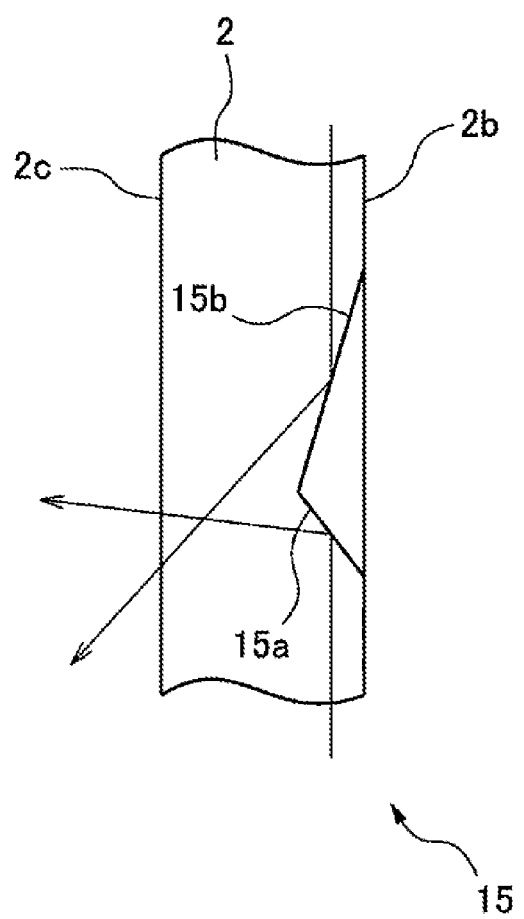
FIG. 10B is a schematic side view of the prism according to the modification shown in FIG. 10A.

FIG. 10A is a schematic front view of a prism formed on a light guiding panel according to still another modification, and FIG. 10B is a schematic side view of the prism according to this modification. In this modification, a prism 15 is formed as a triangular prism groove on the diffusion surface 2b of the light guiding panel. One of the two inclined surfaces of the prism 15 is formed as a reflective surface 15a that reflects light from the corresponding light source toward a direction outside a prescribed range of angles with reference to the direction normal to the outgoing surface, and the other of the two inclined surfaces is formed as a diffusion surface 15b that reflects light from another light source toward a direction different from the direction in which a viewer is positioned. In this modification, the prism 15 is formed so that the inclination angle of the diffusion surface 15b is smaller than the inclination angle of the reflective surface 15a. Therefore, the angle between the direction of light reflected by the diffusion surface 15b and the direction normal to the outgoing surface 2c of the light guiding panel 2 is greater than the angle between the direction of light reflected by the reflective surface 15a and the direction normal to the outgoing surface 2c of the light guiding panel 2. Therefore, the light reflected by the diffusion surface 15b is not viewed by a viewer positioned on the front side of the light guiding panel 2, or is totally reflected by the outgoing surface 2c of the light guiding panel 2 and is not emitted from the light guiding panel 2.

According to still another modification, in order to display a pattern having gradation by changing the brightness of the pattern for each local area, the size of the reflective surface of each prism may be changed for each local area. For example, the prisms may be arrayed such that the prism disposed in a brighter region in the pattern has a greater reflective surface.

Alternatively, in order to display a pattern having gradation, the arrangement density of prisms may be changed for each local area. For example, the prisms may be arrayed such that the arrangement density of the prisms is increased in a brighter region of the pattern.

According to still another modification, in order to make the displayed pattern glitteringly bright, each prism may be arrayed such that the angle between the direction in which the prism faces the light source and the reflective surface is randomly changed for each prism within a prescribed range of angles. In that case, each prism may be rotated or the prism may be formed so that only the reflective surface rotates. The prescribed range of angles only has to be set according to the range of angles in which the viewer can view the pattern with reference to the direction normal to the outgoing surface of the light guiding panel. For example, it only has to be set to a range from about ±5° to about ±10°.

The display device according to the above-described embodiment or modifications may be mounted on a game machine such as a pinball game machine or a slot game machine.

Figure 11:
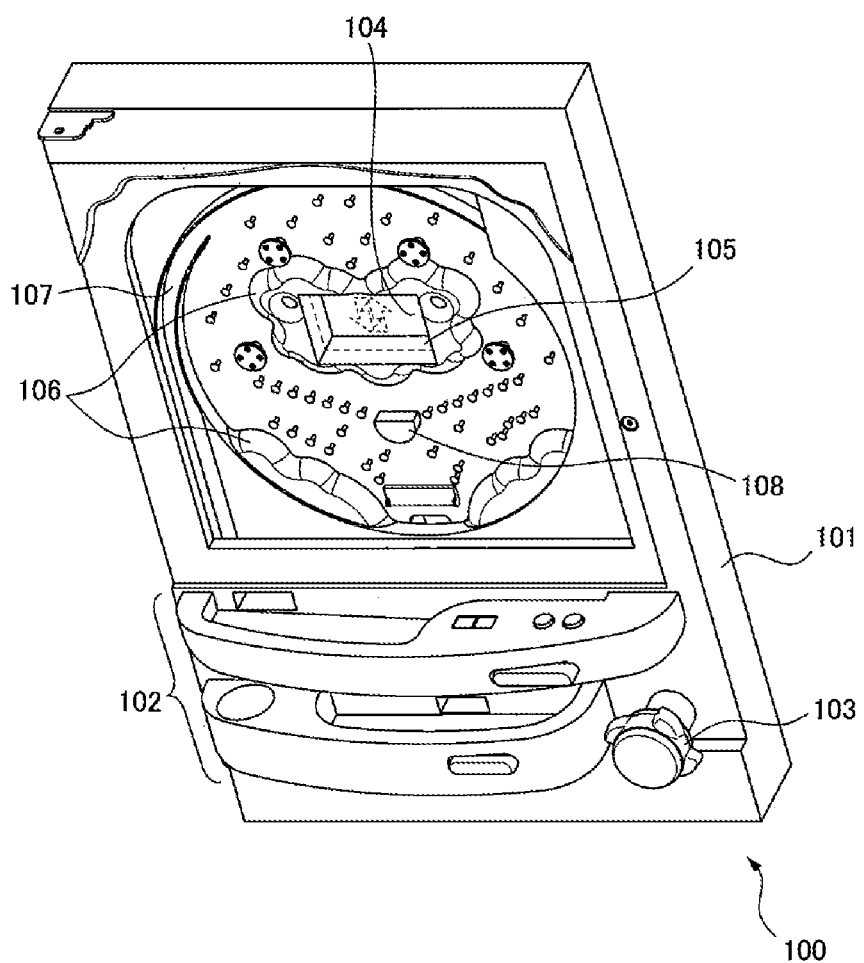
FIG. 11 is a schematic perspective view of a pinball game machine having the display device according to the embodiment or the modifications as seen from a player side.

FIG. 11 is a schematic perspective view of a pinball game machine provided with the display device according to the embodiment or the modifications as seen from a player side. As shown in FIG. 11, the pinball game machine 100 is provided with a game board 101 which is a main body of the game machine provided in most of a region from the upper part to the central part, a ball receiver 102 disposed below the game board 101, an operation unit 103 having a handle, a liquid crystal display 104 provided at a substantially central part of the game board 101, and a display device 105 disposed in front of the liquid crystal display 104.

The pinball game machine 100 also has accessories 106 arranged below the game board 101 or around the display device 105 on the front surface of the game board 101 in order to add excitement to the game. A rail 107 is disposed on the side of the game board 101. Many obstacle nails (not shown) and at least one prize-winning device 108 are provided on the game board 101.

The operation unit 103 launches a game ball with a predetermined force from a launching device (not shown) according to an amount of rotation of the handle operated by a player. The launched game ball moves upward along the rail 107 and falls between a large number of obstacle nails. When a sensor (not shown) detects that a game ball has entered any prize-winning device 108, a main control circuit (not shown) provided on the back of the game board 101 causes a ball discharge device (not shown) to discharge, into the ball receiver 102, a predetermined number of game balls according to the prize-winning device 108 into which the game ball enters. Further, the main control circuit drives the liquid crystal display 104 and the display device 105 via an effect CPU (not shown) provided on the back of the game board 101. Then, the effect CPU transmits to the display device 105 a control signal including turn-on control information corresponding to the game state.

The display device 105 is an example of the display device according to the above-described embodiment or modifications, and is attached to the game board 101 so that the outgoing surface of the light guiding panel faces the player. Furthermore, in this example, the position where the light source can be arranged is limited to one side above the display device 105 due to, for example, the shape of the accessories 106 around the display device 105 etc., and thus, the display device 105 is mounted such that the light sources of the display device 105 are positioned above the display device 105. Then, the controller of the display device 105 sequentially changes the light source to be turned on according to the turn-on control information included in the control signal from the effect CPU, so that the player can see a pattern that dynamically changes in response to the light source which is turned on, as well as an image displayed in the liquid crystal display 104. Alternatively, the controller may turn off all the light sources so that the player can view only an image displayed on the liquid crystal display 104 via the light guiding panel.

As described above, those skilled in the art can make various modifications in accordance with the embodiment to be implemented within the scope of the present invention.

DESCRIPTION OF SYMBOLS 1 display device
2, 31, 41 light guiding panel
2a incoming surface
2b diffusion surface
2c outgoing surface
2d to 2j reflective surface
3-1 to 3-4 light source
11, 11-1 to 11-6, 12 to 15 prism
11a, 12a, 12b, 13a to 13d, 14a, 15a reflective surface
11b, 11c, 12c, 14b, 15b diffusion surface
21 to 24 pattern
collimating lens
storage
controller
100 pinball game machine
101 game board
102 ball receiver
103 operation unit
104 liquid crystal display
105 display device
106 accessory
107 rail
108 prize-winning device

The invention claimed is:

1. A display device comprising:
a light guiding panel that is formed of a transparent member and into a plate shape, is configured to display a plurality of patterns, and comprises an incoming surface formed on one of side surfaces of the light guiding panel;
a plurality of light sources which is arranged to face the incoming surface and which corresponds to the plurality of patterns, respectively; and
a controller configured to control on and off of the plurality of light sources,
wherein the light guiding panel comprises:
a first reflective surface formed on at least one of the side surface of the light guiding panel different from the incoming surface, the first reflective surface being inclined with respect to the incoming surface so as to totally reflect a light emitted from a first light source of the plurality of light sources which corresponds to a first pattern of the plurality of patterns and to change a propagation direction of the emitted light,
wherein the emitted light enters the light guiding panel through the incoming surface and is directed to the first pattern; and
a plurality of prisms formed on a back surface of the light guiding panel for each of the plurality of patterns, wherein the plurality of prisms:
is arrayed along each of the plurality of patterns,
is oriented toward the changed propagation direction of emitted light,
is configured to reflect the emitted light so that the emitted light is emitted through an outgoing surface of the light guiding panel.

2. The display device according to claim 1, wherein the light guiding panel further comprises a second reflective surface formed on another side surface of the light guiding panel different from the first reflective surface and the incoming surface, the second reflective surface further reflecting the emitted light from the first light source and reflected by the first reflective surface, and directing the emitted light toward the first pattern.

3. The display device according to claim 2, wherein the first reflective surface is stepped along a direction parallel to the incoming surface or along a direction perpendicular to the incoming surface and the back surface.

4. The display device according to claim 2, wherein the first reflective surface reflects light which is emitted from a second light source of the plurality of light sources and the emitted light from the second light source enters the light guiding panel through the incoming surface, and the first reflective surface directs the emitted light from the second light source toward a second pattern of the plurality of patterns.

5. The display device according to claim 4, wherein the first reflective surface is stepped along a direction parallel to the incoming surface or along a direction perpendicular to the incoming surface and the back surface.

6. The display device according to claim 1, wherein the first reflective surface is stepped along a direction parallel to the incoming surface or along a direction perpendicular to the incoming surface and the back surface.

7. The display device according to claim 1, wherein the back surface of the light guiding panel is a diffusion surface.

8. The display device according to claim 1, further comprising a collimating lens disposed between the incoming surface and the plurality of light sources, wherein the collimating lens is configured to collimate light emitted from any one of the plurality of light sources.

9. The display device according to claim 8, wherein the collimating lens comprises a plurality of lenses arrayed in a line along a longitudinal direction of the incoming surface, and each of the plurality of lenses corresponds to each light emitted from the plurality of light sources.

10. The display device according to claim 1, further comprising a storage coupled to the controller, wherein the storage stores turn-on control information indicating turn-on sequence or timings of turning on and off of the plurality of light sources.

11. The display device according to claim 1, wherein the plurality of prisms is arrayed in a staggered or lattice pattern within each of the plurality of patterns.

12. The display device according to claim 1, wherein two or more of the plurality of patterns overlap.

13. A pinball game machine comprising the display device according to claim 1.

14. A light guiding panel formed of a transparent member and into a plate shape and configured to display a plurality of patterns, the light guiding panel comprising:
   an incoming surface formed on one of side surfaces of the light guiding panel so as to face a plurality of light sources;
   a reflective surface formed on at least one of the side surface of the light guiding panel different from the incoming surface, the reflective surface being inclined with respect to the incoming surface so as to totally reflect a light emitted from any one of the plurality of light sources, the emitted light entering the light guiding panel through the incoming surface, and the reflective surface changes a propagation direction of the emitted light from any one of the plurality of light sources
   a plurality of prisms formed on a back surface of the light guiding panel for each of the plurality of patterns, wherein the plurality of prisms:
      is arrayed along each of the plurality of patterns,
      is oriented toward the changed propagation direction of emitted light,
      is configured to reflect the emitted light so that the emitted light is emitted through an outgoing surface of the light guiding panel.

15. The light guiding panel according to claim 14, further comprising two or more side surfaces adjacent to the incoming surface, wherein the two or more side surfaces are reflective surfaces and tapered at an angle from the incoming surface.

16. The light guiding panel according to claim 15, wherein the two or more side surfaces reflect the light emitted from any one of the plurality of light sources and propagates the emitted light in a direction parallel to a longitudinal direction of the incoming surface.

17. The light guiding panel according to claim 14, wherein each of the plurality of prisms comprises at least three inclined surfaces having an angle from the back surface.

18. The light guiding panel according to claim 17, wherein at least one of the at least three inclined surfaces is a reflective surface.

19. The light guiding panel according to claim 18, wherein at least one of the at least three inclined surfaces is a diffusion surface, and the diffusion surface is inclined with respect to the propagation direction.

20. The light guiding panel according to claim 19, wherein the reflective surface of the at least one of the at least three inclined surfaces is angled with respect to the diffusion surface.

* * * * *